(12) United States Patent
Ando (10) Patent No.: US 9,329,446 B2
(45) Date of Patent: May 3, 2016

(54) LIQUID CRYSTAL DISPLAY DEVICE AND METHOD OF MANUFACTURING THE SAME

(71) Applicant: Masanori Ando, Ishikawa-ken (JP)

(72) Inventor: Masanori Ando, Ishikawa-ken (JP)

(73) Assignee: Japan Display Inc., Tokyo (JP)

( * ) Notice: Subject to any disclaimer, the term of this patent is extended or adjusted under 35 U.S.C. 154(b) by 315 days.

(21) Appl. No.: 13/788,037

(22) Filed: Mar. 7, 2013

(65) Prior Publication Data

US 2013/0271716 A1 Oct. 17, 2013

(30) Foreign Application Priority Data

Apr. 12, 2012 (JP) .................................. 2012-090891

(51) Int. Cl.
| | | |
|---|---|---|
| *G02F 1/1345* | (2006.01) | |
| *G02F 1/13* | (2006.01) | |
| *G02F 1/1333* | (2006.01) | |
| *G02F 1/1362* | (2006.01) | |

(52) U.S. Cl.
CPC .......... *G02F 1/13458* (2013.01); *G02F 1/1309* (2013.01); *G02F 1/133351* (2013.01); *G02F 1/136204* (2013.01)

(58) Field of Classification Search
CPC .............................................. G02F 1/136204
See application file for complete search history.

(56) References Cited

U.S. PATENT DOCUMENTS

| | | | |
|---|---|---|---|
| 5,220,443 A | 6/1993 | Noguchi | |
| 6,774,957 B2 * | 8/2004 | Jinno et al. | ...................... 349/40 |
| 7,728,913 B2 * | 6/2010 | Mochizuki | ............ G02F 1/1345 345/87 |
| 8,654,301 B2 * | 2/2014 | Sato | ...................... G02F 1/13452 349/149 |
| 2007/0013855 A1 | 1/2007 | Ando et al. | |
| 2008/0116181 A1 | 5/2008 | Wu et al. | |
| 2010/0118250 A1 * | 5/2010 | Fujikawa | ...................... 349/139 |

FOREIGN PATENT DOCUMENTS

| | | |
|---|---|---|
| CN | 1355561 A | 6/2002 |
| CN | 101078823 A | 11/2007 |
| CN | 101273494 A | 9/2008 |
| CN | 101641638 A | 2/2010 |
| EP | 1 160 616 A1 | 12/2001 |
| JP | 2-290053 | 11/1990 |

(Continued)

OTHER PUBLICATIONS

Office Action issued Sep. 29, 2015 in Japanese Patent Application No. 2012-090891 (with English language translation).

(Continued)

*Primary Examiner* — Jessica M Merlin
*Assistant Examiner* — Mark Teets
(74) *Attorney, Agent, or Firm* — Oblon, McClelland, Maier & Neustadt, L.L.P (57) ABSTRACT

In one embodiment, an array substrate includes a first array area and a second array area adjoining the first array area. The first array area includes a first electric power supply line arranged along a periphery of the first array area. The second array area includes a pixel electrode, a second electric power supply line arranged along a periphery of the second array area, and an electric power supply pad electrically connected with the second electric power supply line. The electric power supply pad is arranged facing the first electric power supply line so as to sandwich a boundary between the first array area and the second array area. Corner potions of the electric power supply pad facing the first electric power supply line are formed in an arc shape.

8 Claims, 8 Drawing Sheets

(56) References Cited

FOREIGN PATENT DOCUMENTS

| | | |
|---|---|---|
| JP | 11-15020 | 1/1999 |
| JP | 2006-301138 A | 11/2006 |
| JP | 2008-96475 A | 4/2008 |
| JP | 2008-130653 A | 6/2008 |
| JP | 2011-158663 | 8/2011 |
| JP | 2011-165860 | 8/2011 |
| TW | 200830246 A | 7/2008 |
| WO | WO 2008/129621 A1 | 10/2008 |
| WO | WO 2008/129709 A1 | 10/2008 |

OTHER PUBLICATIONS

Combined Chinese Office Action and Search Report issued May 6, 2015 in Patent Application No. 201310126035.5 (with English language translation).

Office Action mailed Dec. 3, 2015 in Chinese Patent Application No. 201310126035.5 (with English Translation).

Office Action issued Mar. 1, 2016 in Japanese Patent Application No. 2012-090891 (with English language translation).

* cited by examiner

LIQUID CRYSTAL DISPLAY DEVICE AND METHOD OF MANUFACTURING THE SAME

CROSS-REFERENCE TO RELATED APPLICATION

This application is based upon and claims the benefit of priority from prior Japanese Patent Application No. 2012-090891 filed Apr. 12, 2012, the entire contents of which are incorporated herein by reference.

FIELD

Embodiments described herein relate generally to a liquid crystal display device and a method of manufacturing the same.

BACKGROUND

A liquid crystal display device is used in various fields of OA equipments such as a personal computer and a television set, taking advantage of the features such as a light weight, a thin shape, and low power consumption. In recent years, the liquid crystal display device is used also as displays for a portable remote terminal such as a cellular phone and a PDA (personal digital assistant), a car navigation equipment, and a game machine.

In a process for manufacturing the liquid crystal display device, a measure against static electricity is indispensable. For example, there is a possibility that the static electricity generated in the manufacturing process or invaded from the outside gives damage to circuits containing various wirings and switching elements in an active area. For example, an electric power supply pad in a polygonal shape is provided in an electric power supply portion on one substrate to supply electric power to the other substrate. If wirings such as a common line having crooked portions are arranged adjoining the electric power supply pad, the static electricity invading to the power supply pad or wirings easily concentrates in an angled portion of the electric power supply pad or the crooked portion of the wirings, and easily discharges. Therefore, there is a possibility of destroying neighboring wirings and circuits. Various techniques for improving tolerance over such static electricity are reviewed.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device and a method of manufacturing the same according to an exemplary embodiment of the present invention will now be described with reference to the accompanying drawings wherein the same or like reference numerals designate the same or corresponding portions throughout the several views.

According to one embodiment, a liquid crystal display device includes: a first substrate including a first array area and a second array area adjoining the first array area, the first array area including a first electric power supply line arranged along a periphery of the first array area, and the second array area including a pixel electrode, a second electric power supply line arranged along a periphery of the second array area, and an electric power supply pad electrically connected with the second electric power supply line; a second substrate arranged facing the first substrate, including a common electrode facing the pixel electrode and extending to a portion facing the electric power supply pad; a liquid crystal layer held between the pixel electrode and the common electrode; and an electric conductive element for electrically connecting the electric power supply pad with the common electrode; wherein the electric power supply pad is arranged facing the first electric power supply line so as to sandwich a boundary between the first array area and the second array area, and corner portions of the electric power supply pad facing the first electric power supply line are formed in an arc shape.

According to other embodiment, a liquid crystal display device includes: a first substrate formed of a rectangular shape including a first end portion, a second end portion, a third end portion and a fourth end portion, a pixel electrode, a first common terminal and a second control terminal arranged in the first end portion and set to a common potential, an electric power supply line connected with the first common terminal extending along the second end portion, the third end portion and the fourth end portion in this order and connected with the second common terminal, and an electric power supply pad arranged in the second end portion and electrically connected with the electric power supply line; a second substrate arranged facing the first substrate, and including a common electrode facing the pixel electrode and extending to a portion facing the electric power supply pad; a liquid crystal layer held between the pixel electrode and the common electrode; and an electric conductive element for electrically connecting the electric power supply pad with the common electrode; wherein the electric power supply pad includes corner portions arranged on a first edge side along the second end portion of the first substrate and formed in an arc shape.

According to other embodiment, a method of manufacturing a liquid crystal display device including a first substrate and a second substrate facing the first substrate, comprising the steps: forming a first array area and a second array area adjoining the first array area in the first substrate; forming a first electric power supply line arranged along a periphery of the first array area in the first substrate; forming a second electric power supply line arranged along a periphery of the second array area in the first substrate; forming an electric power supply pad arranged in the second array area, the electric power supply pad arranged facing the first electric power supply line so as to sandwich a boundary between the first array area and the second array area, and corner portions of the electric power supply pad facing the first electric power supply line and formed in an arc shape; forming a pixel electrode in the first substrate; forming a common electrode in the second substrate so as to face the pixel electrode and extend to a portion facing the electric power supply pad; forming a liquid crystal layer between the pixel electrode and the common electrode; electrically connecting the electric power supply pad and the common electrode; and cutting the first substrate and the second substrate along the boundary between the first array area and the second array area.

Figure 1:
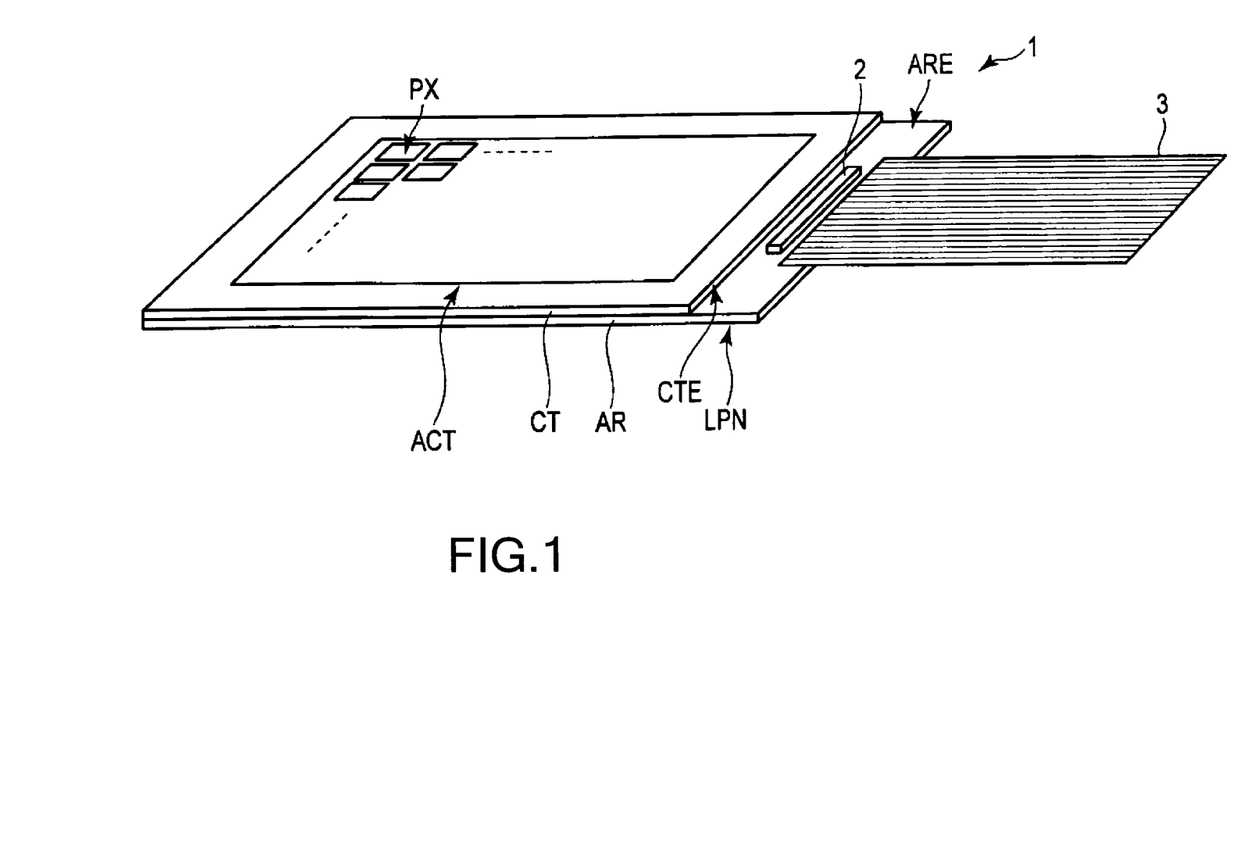
FIG. 1 is a view schematically showing a structure of a liquid crystal display device according to one embodiment.

FIG. 1 is a view schematically showing a structure of a liquid crystal display device according to one embodiment.

A liquid crystal display device 1 is equipped with a liquid crystal display panel LPN of an active-matrix type, a driving IC chip 2 connected to a flexible printed circuit board 3, etc.

The liquid crystal display panel LPN is equipped with a rectangular array substrate (first substrate) AR, a rectangular counter substrate CT (second substrate) facing the array substrate AR and a liquid crystal layer LQ held between the array substrate AR and the counter substrate CT. The liquid crystal display panel LPN is equipped with an active area ACT which displays images. The active area ACT is constituted by a plurality of pixels PX in a rectangular shape, for example, and formed in the shape of a matrix of (m×n) pixels PX ("m" and "n" are positive integers).

The array substrate AR includes an extending area ARE extending to outside beyond an end CTE of the counter substrate CT. The driving IC chip 2 and the flexible printed circuit board 3 function as a signal source for supplying signals required for the driving of the pixel PX, and are mounted in the extending area ARE of the array substrate AR.

Figure 2:
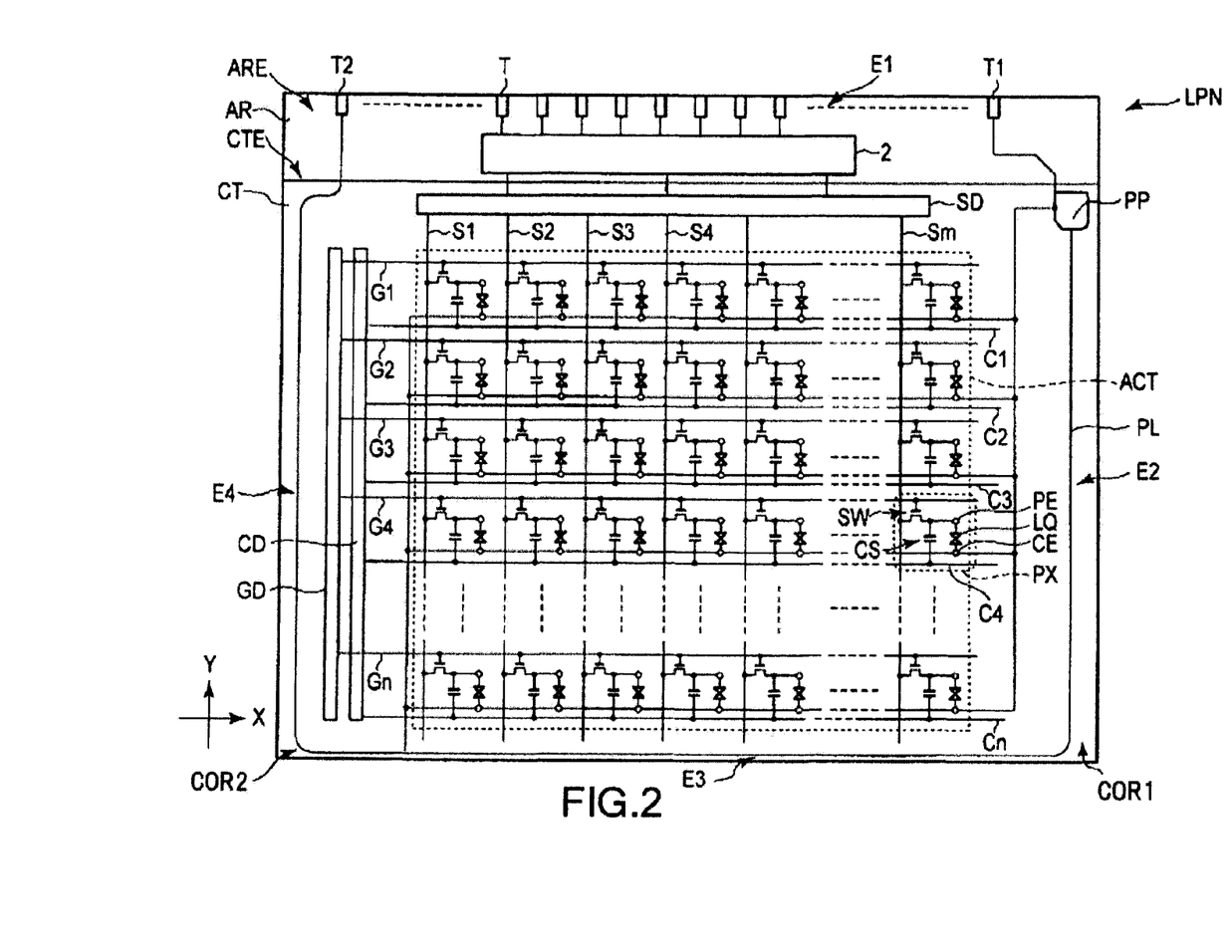
FIG. 2 is a view schematically showing a structure and the equivalent circuit of a liquid crystal display panel shown in FIG. 1 according to the embodiment.

FIG. 2 is a view schematically showing a structure and the equivalent circuit of the liquid crystal display panel LPN shown in FIG. 1 according to the embodiment.

The array substrate AR includes a first end portion E1, a second end portion E2, a third end portion E3, and a fourth end portion E4 surrounding the rectangular active area ACT. The first end portion E1 and the third end portion E3 counter mutually and extend along a first direction X, respectively. The second end portion E2 and the fourth end portion E4 counter mutually in a second direction Y that perpendicularly intersects the first direction X. The first end portion E1 is located in the extending portion ARE. The second end portion E2, the third end portion E3, and the fourth end portion E4 counter with the counter substrate CT.

The array substrate AR is equipped with "n" gate lines G (G1-Gn), "n" auxiliary capacitance lines C (C1-Cn), "m" source lines S (S1-Sm), etc., in the active area ACT. The gate line G and the auxiliary capacitance line C linearly extend in the first direction X, respectively. The source lines S cross with the gate line G and the auxiliary capacitance line C through an insulating layer, and linearly extend in the second direction Y.

Each gate line G is pulled out to the outside of the active area ACT and connected with a gate driver GD. Each auxiliary capacitance line C is pulled out to the outside of the active area ACT and connected with a voltage impressing portion CD for impressing auxiliary capacitance voltage. The respective source lines S are pulled out to the outside of the active area ACT and connected with a source driver SD. The gate driver GD, the source driver SD, and the voltage impressing portion CD, etc., are formed in the array substrate AR.

The pixel electrode PX includes a switching element SW, a pixel electrode PE, and a common electrode CE. The switching element SW and the pixel electrode PE are formed in the array substrate AR. The common electrode CE is arranged in the counter substrate CT. Retention capacitance Cs is formed between the pixel electrode PE and the auxiliary capacitance line C, for example.

The switching element SW is constituted by an n channel type thin film transistor (TFT), for example. The switching element SW is electrically connected with the gate line G and the source line S. The switching element SW may be either a top-gated type or a bottom-gated type. Though the semiconductor layer is formed of poly-silicon in this embodiment, the semiconductor layer may be formed of amorphous silicon.

The pixel electrode PE is arranged in each pixel PX and electrically connected with the switching element SW. The common electrode CE set to common voltage is arranged in common to the plurality of pixel electrodes PE through the liquid crystal layer LQ. The pixel electrode PE and the common electrode CE are formed by light transmissive materials, such as Indium Tin Oxide (ITO), Indium Zinc Oxide (IZO), etc.

Moreover, the array substrate AR includes a plurality of terminals T, an electric power supply line PL, an electric power supply pad PP, etc., outside of the active area ACT. The plurality of terminals T is formed in the extending area ARE of the array substrate AR for connecting the flexible printed circuit board. Common terminals T1 and T2 set to common potential are contained in the terminals T. The electric power supply line PL is formed along with an outermost periphery of the array substrate AR so as to surround the active area ACT and connected with the common terminals T1 and T2. The electric power supply line PL functions as an electric power supply wiring for supplying common potential or a guard ring. The electric power supply pad PP is arranged in a position of the array substrate AR facing the counter substrate CT and electrically connected with the electric power supply line PL. The electric power supply pad PP is electrically connected with the common electrode CE.

In this embodiment, the electric power supply pad PP is arranged in the second end portion E2. One end of the electric power supply line PL is connected with the common terminal T1 and extending along the second end portion E2, the third end portion E3, and the fourth end portion E4 in this order, and the other end thereof is connected with the common terminal T2. The electric power supply line PL located in the second end portion E2 extends along the second direction Y and electrically connected with the power supply pad PP in an intermediate portion thereof. The electric power supply line PL located in the third end portion E3 extends along the first direction X. The electric power supply line PL located in the fourth end portion E4 extends along the second direction Y. Moreover, the electric power supply line PL is formed in the shape of a curved line or circle at a corner COR1 where the second end portion E2 and the third end portion E3 cross, and a corner COR2 where the third end portion E3 and the fourth end portion E4 cross.

Figure 3:
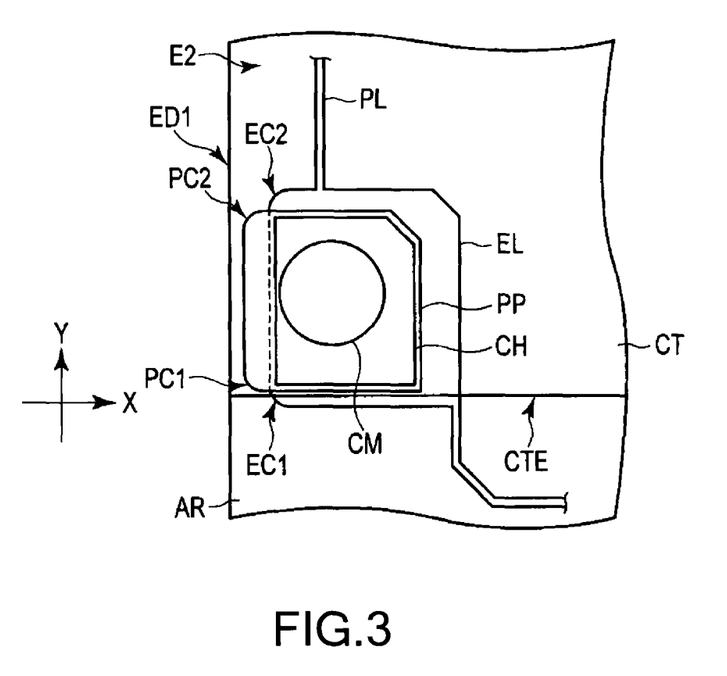
FIG. 3 is an enlarged plan view showing an electric power supply pad shown in FIG. 2.

FIG. 3 is an enlarged plan view showing an electric power supply pad shown in FIG. 2. Here, only the structures necessary for explaining are illustrated.

Although the electric power supply pad PP is formed substantially in the shape of a polygon, corner portions located on an edge ED1 side along the second end portion E2 of the array substrate AR is formed in the shape of an arc. In this embodiment, the electric power supply pad PP is formed substantially in a rectangular shape and provided with two corner portions PC1 and PC2 on the edge ED1 side, and the corner portions PC1 and PC2 are formed in a rounded arc shape.

The electric power supply line PL is equipped with an electric power supply electrode EL located under the electric power supply pad PP. That is, the electric power supply electrode EL is a portion of the electric power supply line PL, and integrally formed with the electric power supply line PL. Neither the electric power supply pad PP is necessarily the same form as the electric power supply electrode EL, nor overlaps with the electric power supply electrode EL completely. The electric power supply pad PP is in contact with the electric power supply electrode EL through a contact hole C11.

Although the electric power supply electrode EL is formed substantially in the shape of a polygon, the corner portion located on the edge ED1 side is formed in the arc shape. In this embodiment, although the electric power supply electrode EL is formed substantially in a rectangular shape and provided with two corner portions EC1 and EC2 on the edge ED1 side, both of the corner portions EC1 and EC2 are formed in the rounded arc shape. That is, the corner portions EC1 and EC2 are formed with roundness.

An electric conductive element CM is located on the electric power supply pad PP, and electrically connects the electric power supply pad PP with the common electrode which is not illustrated.

Figure 4:
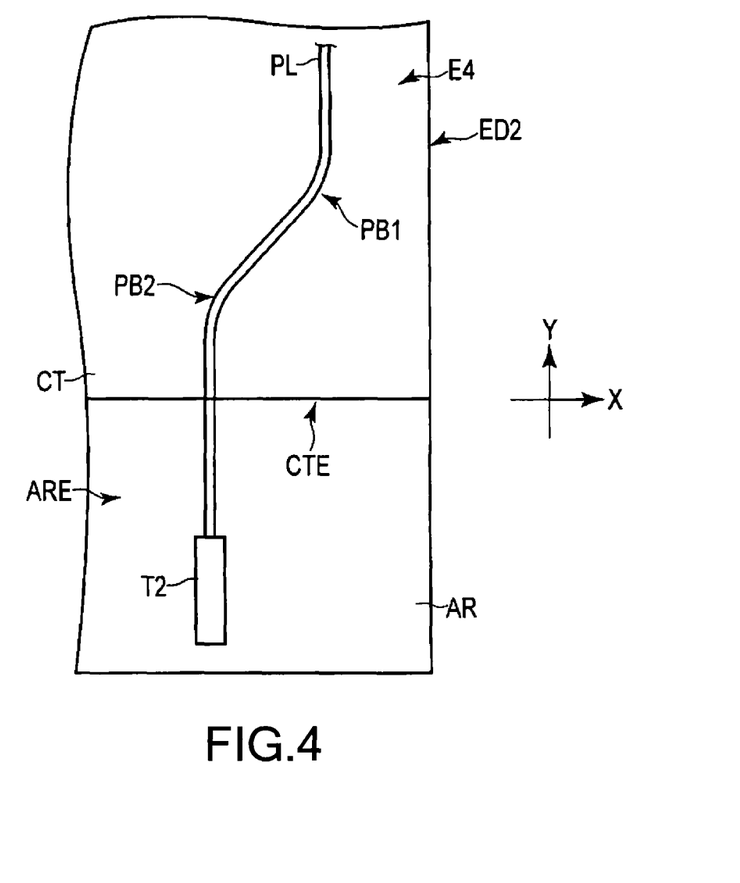
FIG. 4 is an enlarged plan view showing an electric power supply line in a fourth end portion shown in FIG. 2.

FIG. 4 is an enlarged plan view showing the electric power supply line PL in the fourth end portion E4 shown in FIG. 2. In addition, only the structures necessary for explaining are illustrated here.

Although the electric power supply line PL located in the fourth end portion E4 is formed substantially in the shape of a straight line, a crooked portion crooked so as to be apart from an edge ED2 along the fourth end portion E4 of the array substrate AR is formed in the arc shape. According to this embodiment, the electric power supply line PL is formed in a straight line in a portion apart from the common terminal T2 along the edge ED2 in the area where the electric power supply line PL faces the counter substrate CT. In a crooked portion PB1 near a counter substrate end CTE, the electric power supply line PL is crooked so as to be apart from the second edge ED2. Furthermore, the electric power supply line PL is again crooked in a crooked portion PB2 near the counter substrate end CTE, and linearly pulled out to the extending portion ARE. The electric power supply line PL is connected with the common terminal T2. Both of the crooked portions PB1 and PB2 are formed in a rounded arc shape. The shape of the crooked portions PB1 and PB2 is not any one of an acute angle shape, right angle shape, and the obtuse shape.

Figure 5:
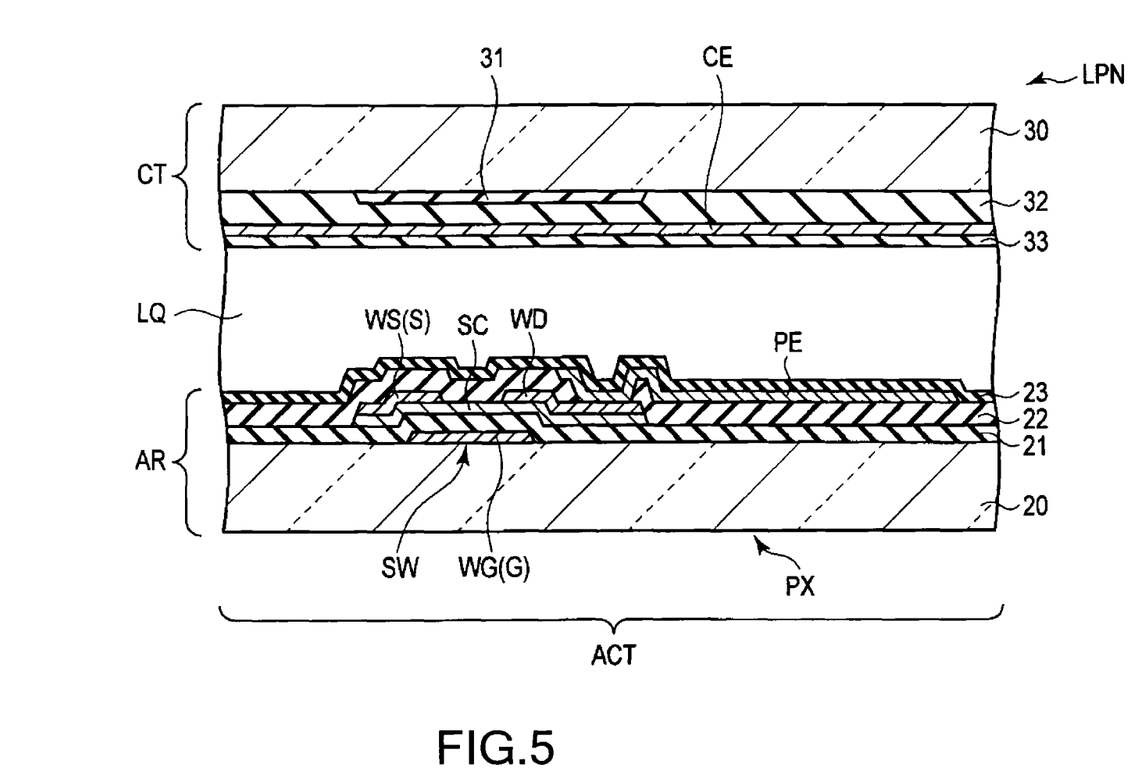
FIG. 5 is a cross-sectional view schematically showing a pixel in the display panel shown in FIG. 2.

FIG. 5 is a cross-sectional view schematically showing the structure of one pixel of the liquid crystal display panel shown in FIG. 2.

The array substrate AR is formed using a first insulating substrate 20 which has light transmissive characteristics such as a glass substrate and a plastic substrate. The array substrate AR includes the switching element SW, the pixel electrode PE, etc. The switching element SW shown here is a thin film transistor of a bottom gated-type. The gate electrode WG of the switching element SW is formed on the first insulating substrate 20 with the gate line G. The gate electrode WG is electrically connected with the gate line G and integrally formed with the gate line G in this embodiment. The gate electrode WG is covered with a first insulating layer 21. The first insulating layer 21 is arranged also on the first insulating substrate 20.

The semiconductor layer SC of the switching element SW is formed of the amorphous silicon, for example. The semiconductor layer SC is formed on the first insulating layer 21 and located on the gate electrode WG. A source electrode WS and a drain electrode WD of the switching element SW are formed on the first insulating layer 21, and at least one portion thereof is in contact with the semiconductor layer SC, respectively. The source line S is formed on the first insulating layer 21. The source electrode WS is electrically connected with the source line S and integrally formed with the source line S in this embodiment. The source electrode WS and the drain electrode WD are covered with a second insulating layer 22 with the source line S. Moreover, the second insulating layer 22 is arranged also on the first insulating layer 21.

The pixel electrode PE is formed on the second insulating layer 22. The pixel electrode PE is in contact with the drain electrode WD through a contact hole which penetrates the second insulating layer 22. The pixel electrode PE and the second insulating layer 22 are covered with a first alignment film 23.

On the other hand, the counter substrate CT is formed using a second insulating substrate 30 which has light transmissive characteristics, such as the glass substrate and the plastic substrate. The counter substrate CT includes a black matrix 31, a color filter layer 32, the common electrode CE, etc., on the second insulating substrate 30 facing the array substrate AR.

The black matrix 31 is formed between adjoining pixels PX in the active area ACT, and counters various wiring portions such as the switching element SW, the gate line G, the source line S formed on the array substrate AR. The color filter layer 32 is arranged in each pixel PX defined by the black matrix 31 in the active area ACT. A portion of the color filter layer 32 overlaps with the black matrix 31.

In the active area ACT, the common electrode CE is formed on the color filter layer 32 facing the array substrate AR and counters the pixel electrode PE of each pixel PX through the liquid crystal layer LQ. The common electrode CE is covered with a second alignment film 33.

The array substrate AR and the counter substrate CT as mentioned above are arranged so that the first alignment film 23 faces the second alignment film 33. At this time, a spacer, for example, a pillar-shaped spacer integrally formed with one of the substrates by resin material is arranged between the array substrate AR and the counter substrate CT. Thereby, a predetermined cell gap is formed.

The liquid crystal layer LQ is enclosed in the cell gap as mentioned above. That is, the liquid crystal layer LQ is constituted by liquid crystal composite held between the pixel electrode PE on the array substrate AR and the common electrode CE on the counter substrate CT.

Regarding the liquid crystal mode, there is no restriction in particular. In addition, the modes which mainly use vertical electric field or slanting electric field such as TN (Twisted Nematic) mode, OCB (Optically Compensated Bend) and VA (Vertical Aligned) mode are applicable.

Figure 6:
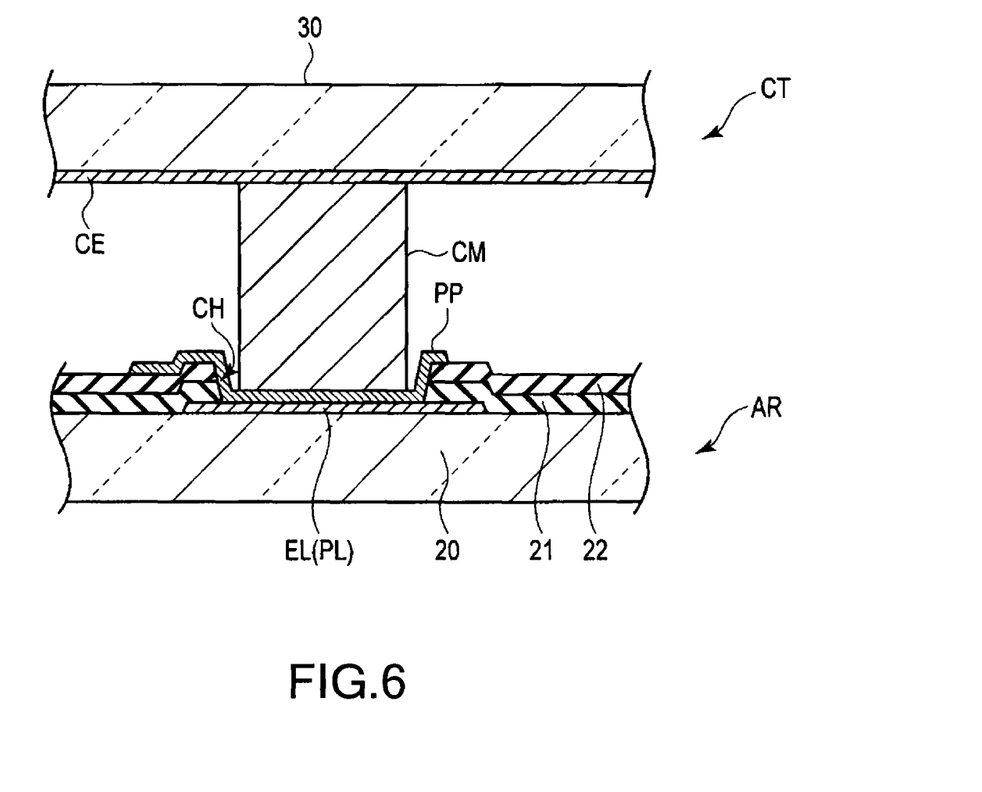
FIG. 6 is a cross-sectional view schematically showing a power supply structure from an array substrate to a counter substrate.

FIG. 6 is a cross-sectional view schematically showing an electric power supply structure from the array substrate to the counter substrate.

The electric power supply electrode EL integrally formed with the electric power supply line PL is formed on the first insulating substrate 20. The electric power supply line PL and the electric power supply electrode EL are covered with the first insulating layer 21. A contact hole CH penetrating to the electric power supply electrode EL is formed in the first insulating layer 21 and the second insulating layer 22. The electric power supply pad PP is formed on the second insulating layer 22 and in contact with the electric power supply electrode EL through the contact hole CH.

The electric power supply line PL and the electric power supply electrode EL are formed of the same electric conductive layer as the gate line G explained previously using the same wiring material as the gate line G. The electric power supply pad PP is formed of the same electric conductive layer as the pixel electrode PE explained previously using the same electric conductive material as the pixel electrode PE.

The common electrode CE extends to the outside of the active area ACT. Namely, the common electrode CE counters with the pixel electrode PE through the liquid crystal layer LQ in the active area ACT as shown in FIG. 5, and extends to a portion facing the electric power supply pad PP crossing seal material (not shown).

An electric conductive element CM contacts the electric power supply pad PP and the common electrode CE, and electrically connects both of them. Thereby, the voltage impressed to the electric power supply line PL is supplied to the electric power supply pad PP through the electric power supply electrode EL, and the electric power is further supplied to the common electrode CE through the electric conductive element CM.

Figure 7:
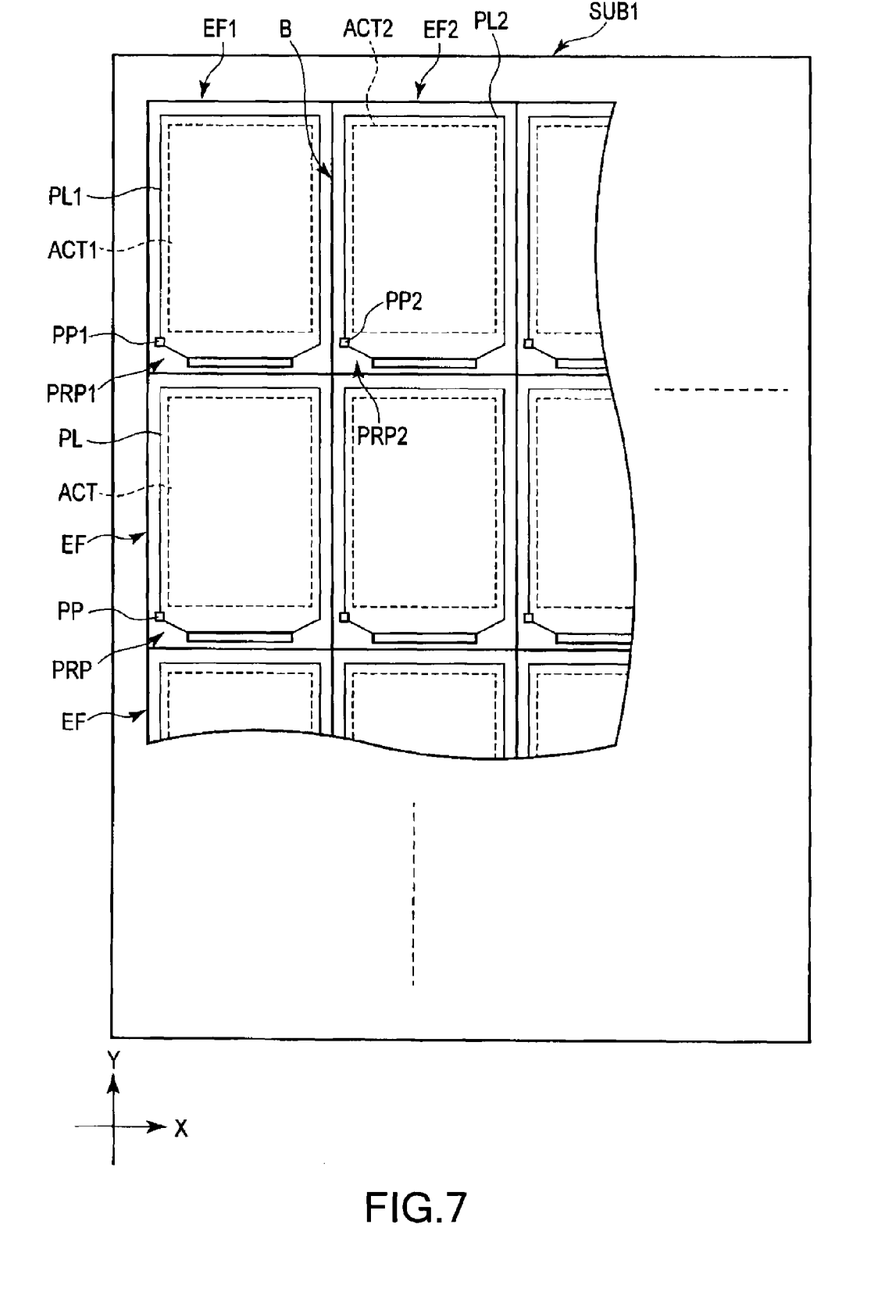
FIG. 7 is a plan view showing a structure of a first substrate for manufacturing the array substrate which constitutes the liquid crystal display panel according to this embodiment.

FIG. 7 is a plan view showing a structure of a first substrate SUB1 for manufacturing the array substrate which constitutes the liquid crystal display panel LPN according to this embodiment.

The first substrate SUB1 for forming the array substrate AR is manufactured using a large-sized glass substrate. A plurality of array areas EF for the array substrates AR is formed in the first substrate SUB1. The plurality of array areas EF is located in a line in the second direction Y while they are located also in a line in the first direction X. That is, they are formed in the shape of a matrix. The solid line in the figure showing the array area EF is a planned cut line which is used when the first substrate SUB1 is cut into individual array substrates AR later. That is, each array area EF is an inner area surrounded by the planned cut line.

Each array area EF includes the active area ACT and a peripheral area PRP. In each active area ACT, after forming the gate line G, the first insulating layer 21 is formed. Then, after the source line S and the switching element SW are formed on the first insulating layer 21, the second insulating layer 22 is formed. Further, the pixel electrode PE and the first alignment film 23 are formed. In each peripheral area PRP, the electric power supply line PL is formed at the same time as the gate line G is formed. Then, the electric power supply pad PP, etc., are formed at the same time as the pixel electrode PE is formed, but detailed illustration is omitted.

In the array area EF, a first array area EF1 and a second array area EF2 adjacent to the first array area EF1 in the first direction X are contained. The electric power supply line PL1 and the electric power supply pad PP1 are arranged in the peripheral area PRP1 of the first array area EF1. Similarly, the electric power supply line PL2 and the electric power supply pad PP2 are arranged in the peripheral area PRP2 of the second array area EF2.

More specifically, the electric power supply line PL1 is arranged along with a perimeter of the first array area EF1 so as to surround the active area ACT1. The electric power supply pad PP1 is electrically connected with an intermediate portion of the electric power supply line PL1. The electric power supply line PL2 is arranged along with the perimeter of second array area EF2 so as to surround the active area ACT2. The electric power supply pad PP2 is electrically connected with an intermediate portion of the electric power supply line PL2.

Here, if its attention is paid to a positional relationship between the electric power supply line PL1 and the electric power supply pad PP2, the electric power supply pad PP2 is located facing the electric power supply line PL1 sandwiching a boundary B between the first array area EF1 and the second array area EF2. In addition, the boundary B corresponds to the planned cut line along which the first array area EF1 and the second array area EF2 are cut. That is, the boundary B corresponds to the position of the edge ED2 of the array substrate AR formed by cutting the first array area EF1, or the position of the edge ED1 of the array substrate AR formed by cutting the second array area EF2.

Figure 8:
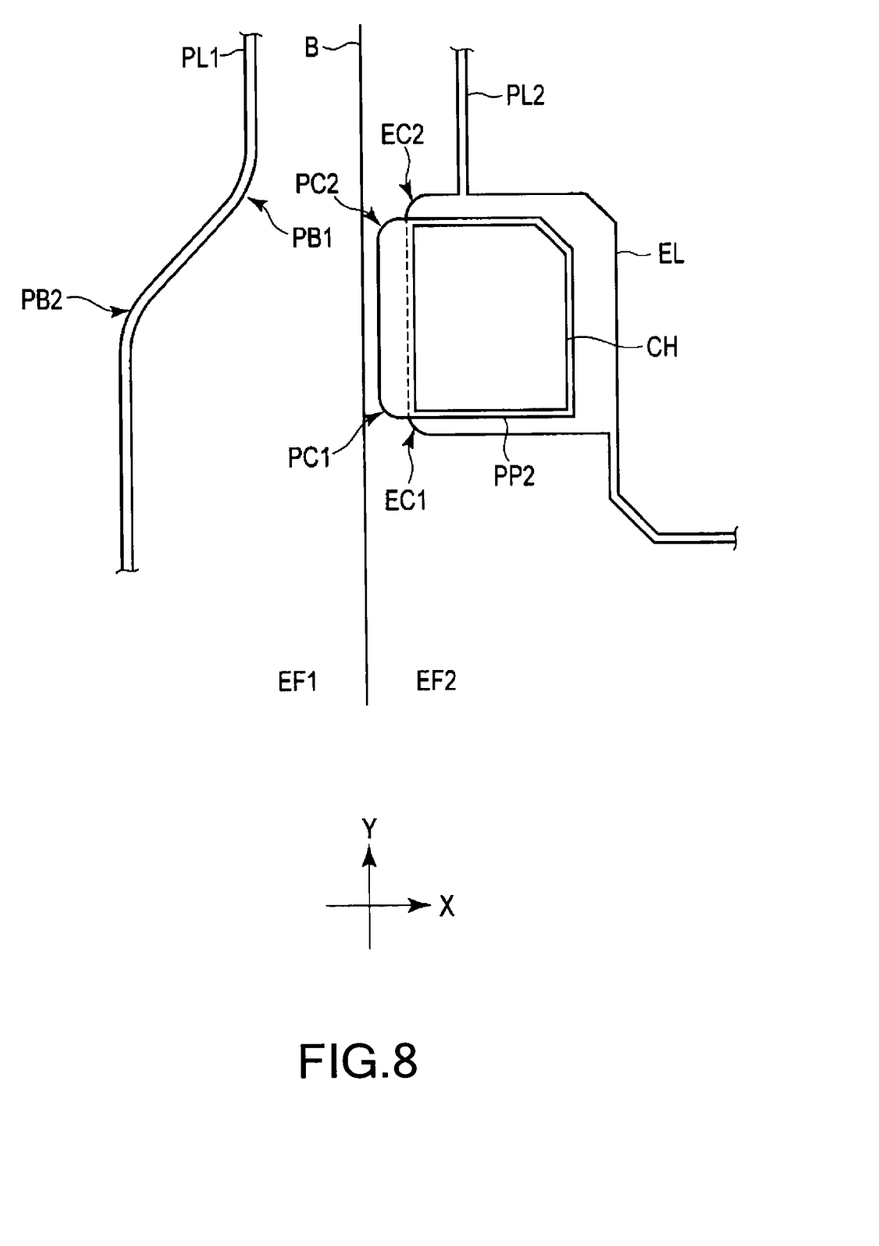
FIG. 8 is an enlarged plan view showing the electric power supply line and the electric power supply pad respectively formed in adjoining array substrates so as to face each other through a boundary between the array substrates in the first substrate.

FIG. 8 is an enlarged plan view showing the electric power supply line PL1 and the electric power supply pad PP2 facing each other sandwiching the boundary B in the first substrate SUB1.

The first array area EF1 is located on the left-hand side in the figure with respect to the boundary B, and the second array area EF2 is located on the right-hand side in the figure with respect to the boundary B. In the second array area EF2, the electric power supply pad PP2 is located facing the electric power supply line PL1 in the first array area EF1 sandwiching the boundary B. The electric power supply pad PP2 includes the corner portions PC1 and PC2 facing the power supply line PL1 or the boundary line B. Both of the corner portions PC1 and PC2 are formed in the arc shape. The electric power supply line PL2 is equipped with the electric power supply electrode EL located under the electric power supply pad PP2. The electric power supply electrode EL includes two corner portions EC1 and EC2 facing electric power supply line PL1. Both of the corner portions EC1 and EC2 are formed in the arc shape.

On the other hand, in the first array area EF1, although the electric power supply line PL1 along the boundary B is formed substantially in the shape of a straight line, the electric power supply line PL1 is crooked so as to be apart from the boundary B at a position facing the electric power supply pad PP2. That is, in the electric power supply line PL1, both of the two crooked portions PB1 and PB2 facing the electric power supply pad PP2 are formed in the arc shape, respectively.

According to this embodiment, in the electric power supply pad PP arranged in the second end portion E2 of the array substrate AR, the corner portions PC1 and PC2 located on the edge ED1 side along the second end portion E2 are formed in the arc shape, respectively. The electric power supply pad PP2 faces the electric power supply line PL1 of an adjoining array area before the first substrate is cut as the array substrate AR. However, since the corner portions PC1 and PC2 of the electric power supply pad PP2 facing the electric power supply line PL are formed in the arc shape, as compared with the case where the corner portions PC1 and PC2 are formed in an acute angle shape, a right angle shape and an obtuse angle shape, it becomes possible to easily control concentration of the static electricity. Moreover, it becomes possible to control electric discharge of the static electricity to the facing electric power supply line PL1 from the corner portions PC1 and PC2. For example, even if the static electricity invades into the electric power supply line PL2, generating of the electric discharge of the static electricity to the electric power supply line PL1 from the electric power supply pad PP2 can be controlled. Further, it becomes possible to control the destruction of the various wirings and circuits in the circumference of the electric power supply pad PP2 and the facing electric power supply line PL1.

Moreover, the electric power supply electrode EL which is a portion of the electric power supply line PL is formed under the electric power supply pad PP. Since, also in the electric power supply line PL, the corner portions EC1 and EC2 located on the edge ED1 side (i.e., facing the adjoining electric power supply line PL before cutting) are formed in the arc shape, it becomes possible to control concentration of the static electricity to the corner portions EC1 and EC2, or the electric discharge of the static electricity from the corner portions EC1 and EC2 to the adjoining electric power supply line PL1.

Moreover, according to this embodiment, in the electric power supply line PL arranged along with the perimeter of the array substrate AR, the crooked portions PB1 and PB2 crooked so as to be apart from the edge ED2 along the fourth end portion E4 are formed in the arc shape. The electric power supply line PL faces the electric power supply pad PP in the adjoining array area before the first substrate is cut into a plurality of array substrates AR. However, since the crooked portions PB1 and PB2 of the electric power supply line PL, which face the electric power supply pad PP, are formed in the arc shape, as compared with the case where the crooked portions PB1 and PB2 are formed in an acute angle shape, a right angle shape, or an obtuse angle shape, it becomes possible to control the concentration of the static electricity. Moreover, it becomes possible to control electric discharge of the static electricity to the facing electric power supply pad PP from the crooked portions PB1 and PB2. For example, even if the static electricity invades into the electric power supply line PL1, generating of the electric discharge of the static electricity from the electric power supply line PL1 to the electric power supply pad PP2 can be controlled. Thereby, it becomes possible to control the destruction of the various wirings and circuits in the circumference of electric power supply line PL1 and the electric power supply pad PP2.

As explained above, according to this embodiment, it becomes possible to control the static electricity defect such as the destruction of the wirings and the circuits resulting from the static electricity. Therefore, the liquid crystal display device can be supplied, in which the fall of the manufacturing yield can be controlled.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device, comprising:
a first substrate including a first array area and a second array area adjoining the first array area, the first array area including a first electric power supply line arranged along a periphery of the first array area, and the second array area including a pixel electrode, a second electric power supply line arranged along a periphery of the second array area, and an electric power supply pad electrically connected with the second electric power supply line;
a second substrate arranged facing the first substrate, including a common electrode facing the pixel electrode and extending to a portion facing the electric power supply pad;
a liquid crystal layer held between the pixel electrode and the common electrode; and
an electric conductive element for electrically connecting the electric power supply pad with the common electrode; wherein
the electric power supply pad is arranged facing the first electric power supply line so as to sandwich a boundary between the first array area and the second array area,
corner portions of the electric power supply pad facing the first electric power supply line are formed substantially in a rounded arc shape,
the second electric power supply line includes an electric power supply electrode arranged under the electric power supply pad and integrally formed with the second electric power supply line,
the electric power supply electrode is substantially in a polygon shape, and
corner portions of the electric power supply electrode facing the first electric power supply line are formed substantially in a rounded arc shape.

2. The liquid crystal display device according to claim 1, wherein the first electric power supply line includes a crooked portion facing the electric power supply pad and formed in an arc shape.

3. The liquid crystal display device according to claim 2, wherein the first electric power supply line along the boundary between the first array area and the second array area is crooked at a position facing the electric power supply pad so as to be apart from the boundary.

4. A liquid crystal display device, comprising:
a first substrate formed of a rectangular shape including a first end portion, a second end portion, a third end portion and a fourth end portion, a pixel electrode, a first common terminal and a second control common terminal arranged in the first end portion and set to a common potential, an electric power supply line connected with the first common terminal extending along the second end portion, the third end portion and the fourth end portion in this order and connected with the second common terminal, and an electric power supply pad arranged in the second end portion and electrically connected with the electric power supply line;
a second substrate arranged facing the first substrate, and including a common electrode facing the pixel electrode and extending to a portion facing the electric power supply pad;
a liquid crystal layer held between the pixel electrode and the common electrode; and
an electric conductive element for electrically connecting the electric power supply pad with the common electrode; wherein
the electric power supply pad includes corner portions arranged on a first edge side along the second end portion of the first substrate and formed substantially in a rounded arc shape,
the electric power supply line includes an electric power supply electrode arranged under the electric power supply pad and integrally formed with the second electric power supply line,
the electric power supply electrode is substantially in a polygon shape, and
corner portions of the electric power supply electrode arranged on the first edge side of the first substrate are formed substantially in a rounded arc shape.

5. The liquid crystal display device according to claim 4, wherein the electric power supply line arranged in the fourth end portion includes a crooked portion crooked so as to be apart from a second edge side along the fourth end portion of the first substrate and formed in an arc portion.

6. A method of manufacturing a liquid crystal display device including a first substrate and a second substrate facing the first substrate, comprising the steps:

forming a first array area and a second array area adjoining the first array area in the first substrate;

forming a first electric power supply line arranged along a periphery of the first array area in the first substrate;

forming a second electric power supply line arranged along a periphery of the second array area in the first substrate;

forming an electric power supply pad arranged in the second array area, the electric power supply pad arranged facing the first electric power supply line so as to sandwich a boundary between the first array area and the second array area, and corner portions of the electric power supply pad facing the first electric power supply line and formed substantially in a rounded arc shape;

forming a pixel electrode in the first substrate;

forming a common electrode in the second substrate so as to face the pixel electrode and extend to a portion facing the electric power supply pad; forming a liquid crystal layer between the pixel electrode and the common electrode;

electrically connecting the electric power supply pad and the common electrode; and cutting the first substrate and the second substrate along the boundary between the first array area and the second array area, wherein the second electric power supply line includes an electric power supply electrode arranged under the electric power supply pad and integrally formed with the second electric power supply line, the electric power supply electrode is substantially in a polygon shape, and corner portions of the electric power supply electrode facing the first electric power supply line are formed substantially in a rounded arc shape.

7. The method of manufacturing a liquid crystal display device according to claim 6, wherein the first and second substrates are respectively formed of an array substrate and a counter substrate.

8. The method of manufacturing a liquid crystal display device according to claim 6, wherein the first electric power supply line is crooked in a position facing the electric power supply pad so as to be apart from the boundary between the first array area and the second array area.

* * * * *